United States Patent
Adkins

(10) Patent No.: US 10,407,996 B2
(45) Date of Patent: Sep. 10, 2019

(54) ONE PIECE FORGED FLUIDIC DISPLACEMENT DRILL PIPE AND METHOD OF MANUFACTURE THEREOF

(71) Applicant: Hunting Energy Services, Inc., Houston, TX (US)

(72) Inventor: Gregory Lynn Adkins, Lafayette, LA (US)

(73) Assignee: Hunting Energy Services, Inc., Houston, TX (US)

(*) Notice: Subject to any disclaimer, the term of this patent is extended or adjusted under 35 U.S.C. 154(b) by 131 days.

(21) Appl. No.: 15/585,276

(22) Filed: May 3, 2017

(65) Prior Publication Data
US 2018/0320452 A1    Nov. 8, 2018

(51) Int. Cl.
| | |
|---|---|
| *E21B 17/00* | (2006.01) |
| *E21B 7/04* | (2006.01) |
| *E21B 17/042* | (2006.01) |
| *F16L 9/147* | (2006.01) |
| *F16L 9/22* | (2006.01) |
| *E21B 17/18* | (2006.01) |
| *F16L 55/027* | (2006.01) |

(52) U.S. Cl.
CPC ........... *E21B 17/006* (2013.01); *E21B 7/046* (2013.01); *E21B 17/042* (2013.01); *E21B 17/18* (2013.01); *F16L 9/147* (2013.01); *F16L 9/22* (2013.01); *F16L 55/027* (2013.01)

(58) Field of Classification Search
CPC ........ E21B 17/18; E21B 7/046; E21B 17/203; F16L 19/19
USPC .......................... 138/114, 115, 116; 166/89.1
See application file for complete search history.

(56) References Cited

U.S. PATENT DOCUMENTS

| | | | |
|---|---|---|---|
| 3,552,779 A | * | 1/1971 | Henderson ............. E21B 17/00 285/123.3 |
| 4,683,944 A | | 8/1987 | Curlett |
| 4,949,797 A | | 8/1990 | Isom |

(Continued)

FOREIGN PATENT DOCUMENTS

| | | |
|---|---|---|
| WO | 86/04950 A1 | 8/1986 |
| WO | 95/17575 A1 | 6/1995 |
| WO | 03/042588 A2 | 5/2003 |

OTHER PUBLICATIONS

GB1807234.8 UKIPO Search Report, 2 pages, dated Jan. 16, 2019.

*Primary Examiner* — Nicole Coy
(74) *Attorney, Agent, or Firm* — Whitaker Chalk Swindle & Schwartz PLLC; Charles Gunter

(57) ABSTRACT

A one piece forged fluidic displacement pipe is shown which can be used for horizontal directional drilling operations. The pipe has a metallic outer tube formed into a one piece forged pipe having opposing upset pin and box ends. The pipe also has an internal surface defined by an internal diameter and an external surface and an initially void interior space. A non-metallic inner tube is inserted within the tube void space so that it is enclosed within and generally coaxially aligned with the outer tube. The inner tube is made up of a plurality of lengths of synthetic plastic type material which pass through the internal diameter of the outer pipe and form a semi-solid circular ring of material which occupies the space along the internal diameter of the outer tube between the upset pin and box ends, effectively decreasing the internal diameter and flow path of the outer metal tube.

11 Claims, 3 Drawing Sheets

(56) References Cited

U.S. PATENT DOCUMENTS

| | | |
|---|---|---|
| 5,174,395 A | 12/1992 | Potvin |
| 5,404,945 A | 4/1995 | Head et al. |
| 5,713,423 A | 2/1998 | Martin et al. |
| 7,134,514 B2 | 11/2006 | Riel et al. |
| 7,152,700 B2 | 12/2006 | Church et al. |
| 7,156,126 B2 * | 1/2007 | Topek ..................... F16L 7/00 |
| | | 138/108 |
| 9,303,795 B2 | 4/2016 | Critsinelis et al. |
| 9,309,997 B2 * | 4/2016 | Jeon ......................... F16L 9/19 |
| 2006/0245989 A1 * | 11/2006 | Miller ................. B01J 19/0053 |
| | | 422/211 |
| 2018/0209565 A1 * | 7/2018 | Lingnau .............. F16L 13/0218 |
| 2018/0356021 A1 * | 12/2018 | King ..................... F16L 39/005 |

* cited by examiner

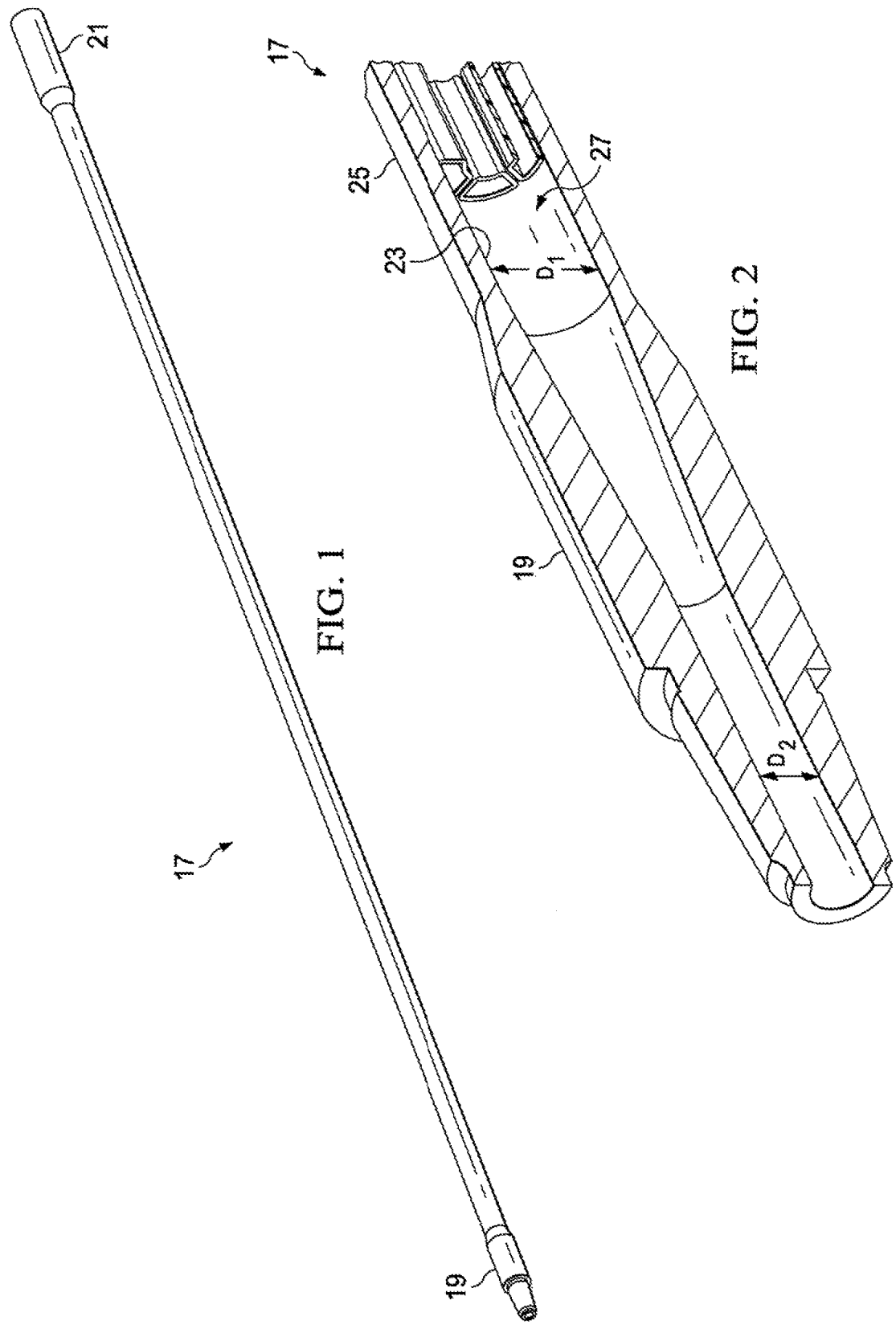

ONE PIECE FORGED FLUIDIC DISPLACEMENT DRILL PIPE AND METHOD OF MANUFACTURE THEREOF

BACKGROUND OF THE INVENTION

1. Field of the Invention

The invention relates to earth boring operations and, in particular to horizontal directional drilling operations using high strength hollow steel pipes joined to form a string used to transmit rotational torque and thrust, and to transport drilling fluid from a drill rig to a drill bit.

2. Description of the Prior Art

Underground drilling operations, and more particularly horizontal directional drilling operations, are increasingly common in today's urban environment. So called "trenchless drilling" operations are preferred, for example, by commercial property owners who are in need of having additional utilities installed, including power, sewer, gas, water, optic cable, or other type telecommunication lines. Such horizontal drilling operations are preferred because they can pass under sidewalks and streets with a minimum of disruption. The conventional directional drilling apparatus (horizontal directional drilling or HDD machine) generally includes a series of drill pipes/rods joined end to end by threaded connections or joint couplings to form a drill string. In the discussion which follows, the terms "drill rod" and "drill pipe" will be used interchangeably. The drill string is typically pushed or pulled though the earth by means of a hydraulic cylinder or gear rack mounted on the HDD machine.

A drill bit or head is attached to the end of the drill string with a coupling and will typically include a fluid nozzle for delivering a drilling fluid to assist in the boring operation. The nozzle has jets which increase discharge velocity. The fluid is discharged at the drill bit to cool the bit and remove debris. The drilling fluid then flows out of the borehole and may be recirculated, for example in the annulus formed between the drill string and the wall of the borehole. The drilling fluids utilized are largely comprised of water but also include such additional additives as bentonite and, if warranted, other additives such as soda ash, polymers, and detergents to address water and soils properties that could compromise the successful completion of the HDD installation.

In the early days of HDD technology, it was generally necessary to fill the entire interior volume of the drill pipe with drilling fluid with the fluid contacting the entire drill pipe interior surface in order to deliver drilling fluid to the drill bit at the cutting face. Filling the larger volume of the pipe took longer than the same scenario in which the internal diameter of the drill pipe was reduced in some fashion. Using some sort of liner also isolated the interior of the steel drill pipe, which reduced the effects of wear and corrosion on the metal drill pipe, in some circumstances.

U.S. Pat. No. 5,174,395 to Potvin is an early patent on an air operated "drill hammer" which recognizes that advantages can flow from reducing the internal diameter of the outer metal drill rod. The Potvin design features an inner tube which extends through the traditional drill rod. The rod and tube form a "dead zone" that reduces the time necessary to compress air within the rod. By presenting a smaller internal cross-sectional flow area within the rod and, as a consequence throughout the drill string, the drill hammer disposed at the bottom of the hole is said to operate more efficiently.

U.S. Pat. No. 5,713,423 to Martin et al., is another early patent describing a section of HDD pipe which uses an interior flexible hose or tube to reduce the volume of the outer metal drill pipe, which "reduces significantly the waste of drilling fluid, allows the fluid to be pressurized more rapidly to initiate drilling operation and limits fluid spill damage to the environment." While this system has been used successfully for many years, it was designed for a section of welded steel drill pipe. Since the ends of the pipe are welded, it was possible to install the cylindrical interior tube in the pipe interior and then weld on the appropriate end fitting. This system will not work in the case of a one piece forged drill pipe, however, since the internal diameter of the pipe upset ends is smaller than the outer diameter of the cylindrical liner employed in the welded pipe process.

U.S. Pat. No. 4,949,797 to Isom and U.S. Pat. No. 9,303,795 to Critsinelis et al. are two other example "pipe in a pipe" designs which feature an interior tube or liner that reduces the interior volume of the drill pipe. These references, as well as the above Potvin and Martin et al. references are merely intended to be illustrative of the general state of the art.

However, as pointed out, even with respect to the Martin et al. reference, further improvements are needed, particularly in the case of one piece forged drill pipe.

The present invention has as one object to provide a one piece forged drill pipe for HDD operations with a new type of synthetic liner which reduces the internal diameter of the surrounding metal drill pipe to achieve the advantages mentioned above.

SUMMARY OF THE INVENTION

The present invention is a one piece forged fluidic displacement pipe which can be used for horizontal directional drilling operations. A specially designed synthetic liner decreases the internal volume of the outer metal pipe, so that a smaller volume of drilling fluid can fill the pipe interior. Since a smaller volume of drilling fluid is required, a drilling rig can be changed out and pressured up faster and also cleaned up faster.

The improved one piece forged pipe of the invention has a metallic outer tube formed as a one piece forged pipe. The pipe has an upset outer tube pin end and an oppositely arranged upset outer tube box end. The pipe also has an internal surface defined by an internal diameter and an external surface and an initially void interior space.

A flexible, substantially non-metallic inner tube that is formed of an synthetic material which differs from the material of the outer tube is substantially enclosed within and generally coaxially aligned with the outer tube in use and constitutes a kind of internal synthetic liner. The inner tube has an internal diameter and an external diameter which is closely received within the internal diameter of the outer tube.

The inner tube is made up of a plurality of lengths of synthetic plastic type material which pass through the internal diameter of the outer pipe and form a semi-solid circular ring of material which occupies the space along the internal diameter of the outer tube between the upset pin and box ends, respectively.

In order to manufacture the improved pipe of the invention, the plurality of lengths of synthetic plastic type material are inserted through a selected one of the upset pin and box ends of the pipe and into the space between the pin and box upset ends after the pipe has been forged. The lengths of synthetic plastic type material support each other to form a continuous ring shaped pattern with external surfaces which contact the internal diameter of the outer pipe and internal surfaces which form a cylindrical bore once installed within the outer pipe. As a result, the plurality of lengths of synthetic plastic type material make up uniform segments of a solid cylindrical body when viewed in cross section.

The plurality of lengths of synthetic plastic type material can be formed of a variety of plastic like materials, any of which is capable of displacing water. Candidate materials include, for example, polyvinyl chloride, acrylonitrile butadiene styrene, acrylics, cellulose acetate butyrate, polycarbonate, low density polyethylene, high density polyethylene, polypropylene, styrene, polyurethane, polyethylene terephthlate glycol/copolyester, styrene butadiene copolymer, thermoplastic rubber (TPR) and thermoplastic elastomer (TPE). Polyvinyl chloride is a particularly preferred material.

Preferably, the plurality of lengths of synthetic plastic type material are formed as hollow longitudinal members which are plugged or capped at each end.

The completed one piece forged steel pipes each have a surface end and, a bit end. The bit end can be connected to a downhole drilling tool and used as a part of a horizontal directional drilling operation. For such an operation, a horizontal directional drilling machine would be connected to a string of the fluid displacement pipe for conveying fluid under pressure through the internal diameter of the inner tube toward the bit end and the downhole drilling tool.

Additional features and advantages will be apparent in the written description which follows.

BRIEF DESCRIPTION OF THE DRAWINGS

FIG. 1 is a perspective view of a section of horizontal directional drilling pipe of the type under consideration showing the upset pin and box ends thereof.

FIG. 2 is a partial sectional view of the pin end of the pipe of FIG. 1 showing a portion of the synthetic liner which has been installed within the internal diameter of the outer pipe.

DETAILED DESCRIPTION OF THE INVENTION

The preferred version of the invention presented in the following written description and the various features and advantageous details thereof are explained more fully with reference to the non-limiting examples included and as detailed in the description which follows. Descriptions of well-known components and processes and manufacturing techniques are omitted so as to not unnecessarily obscure the principal features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 8:
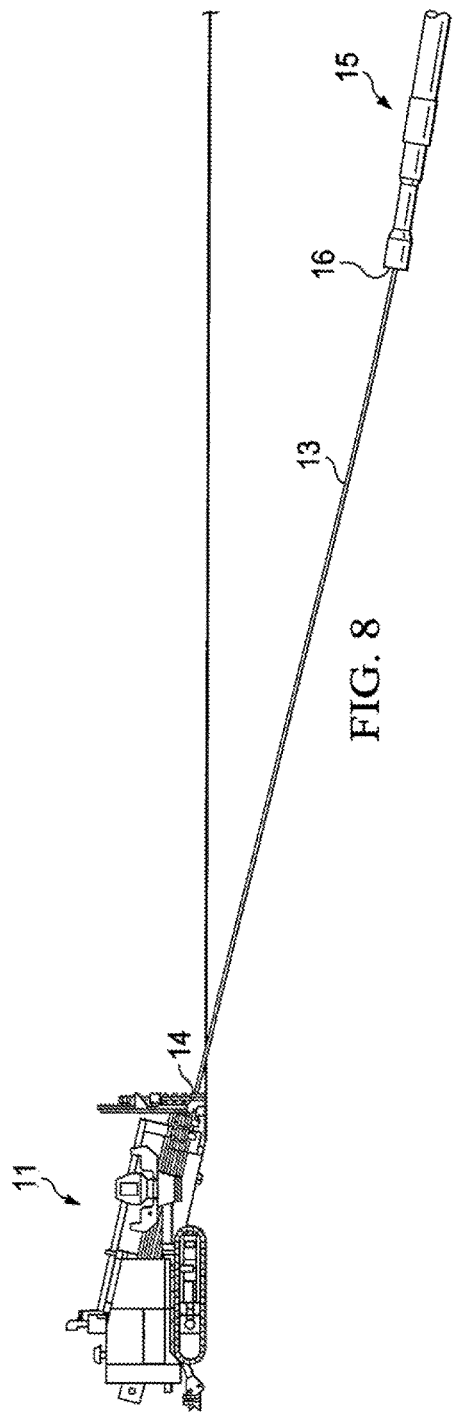
FIG. 8 is a simplified, schematic illustration of a horizontal directional drilling machine of the type which would utilize the one piece forged steel drill pipes of the invention.

Turning now to FIG. 8, there is shown a simplified representation of a horizontal directional drilling (HDD) machine 11, the machine being shown driving a drill string 13 into the ground. The distal end of the drill string includes a drill tool assembly (housing with a flat face bit), illustrated in simplified fashion as 15. The invention is directed to the lengths of drill pipe/drill rod 13 which transmit rotational torque and thrust, and which also are used to transport drilling fluid from the drill rig to the drill bit. As can be seen in FIG. 8, the string of pipe 13 has a surface end 14 which is connected to the horizontal directional drilling machine and an opposite bit end 16 which is connected to the drill tool assembly. The pipe string 13 is thus used to convey fluid under pressure through the internal diameter of the inner tube toward the bit end and the drilling tool.

Drill pipe of this general type has been available for many years in the industry. Byway of example, Hunting Energy Services of Broussard, La., sells the HIWS1 ® HDD Drill Pipe having the following specifications:

| SPECIFICATIONS | U.S. | METRIC |
| --- | --- | --- |
| Pipe | | |
| Outside Diameter | 2.625 in | 6.7 cm |
| Wall Thickness | .400 in | 1 cm |
| Tool Joint | | |
| Outside Diameter | 3.1 in | 7.9 cm |
| Insider Diameter | 1.25 in. | 3.2 cm |
| Length | 10 ft/15 ft | 3 m/4.6 m |
| Weight | 117 lbs/165 lbs | 53.1 kg/74.8 kg |
| Bend Radius | 145 ft | 44.2. m |
| Torque Rating | 5,000 ft-lb | 6779.1 nm |

Turning now to FIG. 1, there is shown a perspective view of one section of the drill pipe 17 of the invention. The particular piece of drill pipe 17 illustrated is a one piece forged design. This design eliminates joints and welds, thereby avoiding the number one source of pipe failure in use. It is formed from a proprietary I-135 steel alloy and has a double shoulder design to handle increased torque and precision machined threads which facilitate make-up and break-out with less fatigue. The section of pipe 17 shown in FIG. 1 has an externally threaded pin connection 19 at one end and an internally threaded box connection 21 at the opposite end thereof.

FIG. 2 shows the pin end 19 of the section of pipe 17 partially cut away and somewhat enlarged fashion for ease of illustration. FIG. 2 shows the pin upset 19 which is of larger external diameter than the remainder of the length of the drill pipe prior to the box end upset. The pipe 17 thus comprises a metallic outer tube formed into a one piece forged pipe. The length of pipe between the pin and box upsets is of generally uniform outer dimension and has an internal surface 23 defined by an internal diameter "$D_1$", an external surface 25 and an initially void interior space (shown generally at 27 in FIG. 2). It will also be noted from FIG. 2 that the internal diameter "$D_1$" is several times greater than the internal diameter "$D_2$" of the pin region.

The drill pipe 17 of the invention differs from the traditional drill pipe in that it operates as a "fluidic displacement" joint. A special type of synthetic liner is installed within at least a portion of the length of the initially void interior space 27. The liner decreases the diameter of the initially void interior space while continuing to provide a bore for fluid flow through the pipe.

Figure 3:
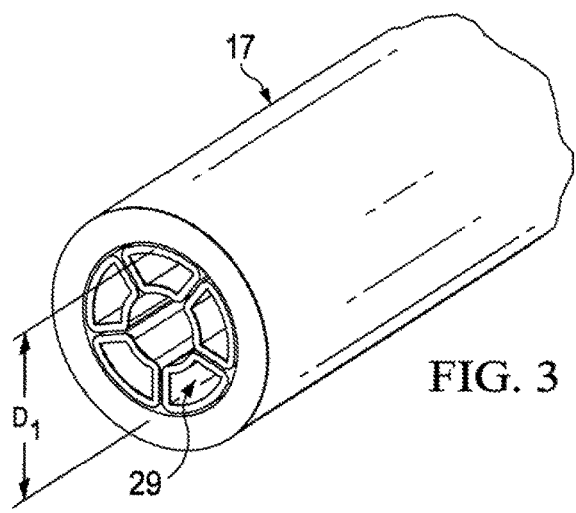
FIG. 3 is a partial perspective view of one section of the pipe of FIG. 1, showing the installed completed synthetic liner.

In the most preferred form, the synthetic liner is a flexible, substantially non-metallic inner tube that is formed of a synthetic material which differs from the material of the metallic outer tube and that is substantially enclosed within and generally coaxially aligned with the metallic outer tube in use. As can be seen in FIG. 3, the inner tube (shown generally at 29) has an internal diameter and an external diameter which is closely received within the internal diameter "$D_1$" of the outer tube.

Figure 4:
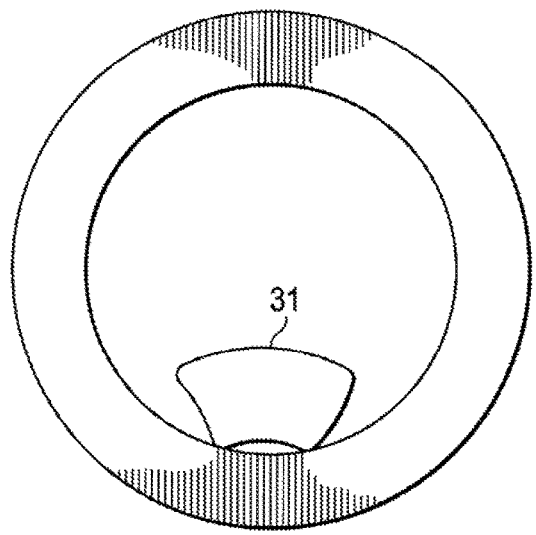
FIG. 4 is an end view of the section of horizontal directional drilling pipe of FIG. 1 showing the beginning installation of one longitudinal length of the synthetic liner where the length of liner is plugged on the end.

Preferably, the inner tube 29 is made up of a plurality of lengths of synthetic plastic type material, such as the length 31 shown in FIG. 4. As will be appreciated from FIG. 4 and the sectional view of FIG. 5, the lengths of synthetic plastic type material pass through the internal diameter "$D_1$" of the outer pipe and form a semi-solid circular ring of material which occupies the space along the internal diameter of the outer tube between the upset pin and box ends 19, 21, respectively. It is generally only necessary to make minimal changes in design to the stock metallic outer tube for purposes of practicing the method of the invention. In some cases, it may be necessary to drill out the ID of the upset end slightly.

By "synthetic plastic type material" is meant generally any type of material which can be used to displace water. Plastic type materials are preferred because they are relatively light weight and inexpensive to extrude. They also have the desired degree of flexibility to allow them to be inserted, e.g., by hand, into the initially void region 27 of the outer metallic tube. Candidate materials include, for example, a material selected from the group consisting of polyvinyl chloride, acrylonitrile butadiene styrene, acrylics, cellulose acetate butyrate, polycarbonate, low density polyethylene, high density polyethylene, polypropylene, styrene, polyurethane, polyethylene terephthlate glycol/copolyester, styrene butadiene copolymer, thermoplastic rubber (TPR) and thermoplastic elastomer (TPE). Polyvinyl chloride is particularly preferred because it is readily available in a variety of sizes and lengths and is relatively inexpensive to produce.

Figure 5:
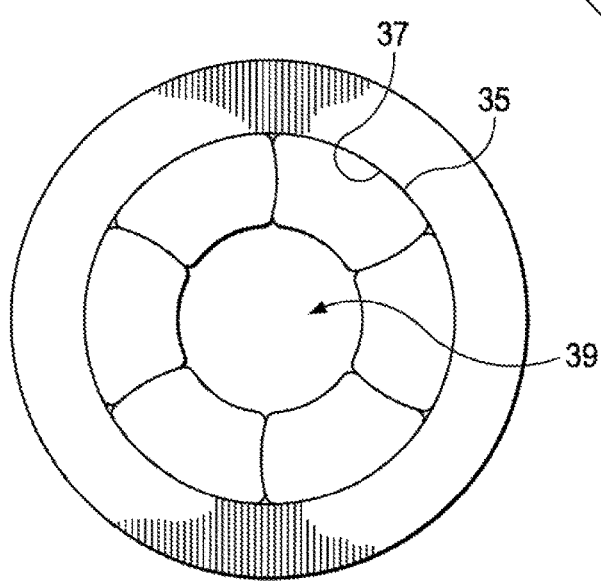
FIG. 5 is an end view of the section of the pipe of FIG. 1 showing the completed and installed synthetic liner.
Figure 7:
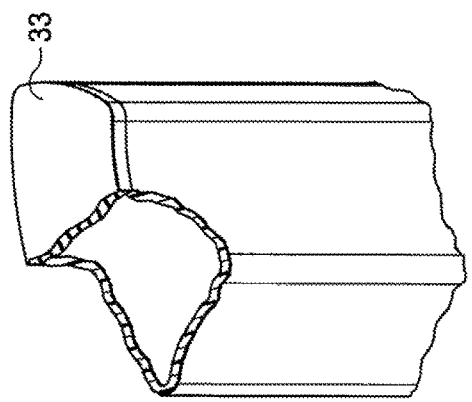
FIG. 7 is an isolated view of a portion of one of the lengths of synthetic liner, shown partly broken away to illustrate the hollow nature of the preferred tubes and plugged end caps.
Figure 6:
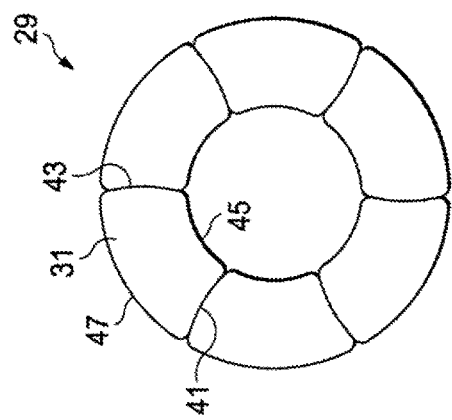
FIG. 6 is an isolated end view of the assembled lengths of synthetic liner showing how the lengths of liner support one another to form a semi-solid ring pattern.

As shown in FIG. 7, the preferred tubes are hollow along a majority of their lengths but are plugged at each end (such as by the plug 33 shown in FIG. 7). Thus, as shown in FIGS. 4 and 5, the plurality of lengths of synthetic plastic type material 31 are inserted, as by hand, through a selected one of the upset pin and box ends 19, 21, of the pipe 17 and into the space (27 in FIG. 2) between the pin and box upset ends. As will be appreciated from FIGS. 5 and 6, the lengths 31 of synthetic plastic type material which form the tubes support each other to form a continuous ring shaped pattern with external surfaces (35 in FIG. 5) which contact the internal diameter 37 of the outer pipe and internal surfaces which form a cylindrical bore 39 once installed within the outer pipe The exact shape and external dimensions of the lengths of plastic type material can vary somewhat, depending upon the end application. With respect to the end view shown in FIG. 6, the plurality of lengths of synthetic plastic type material comprise uniform segments of a solid cylindrical body when viewed from the end or in cross section. Each tube end, such as the end of tube 31 shown in FIG. 6, has a concave first longitudinal wall 41, an oppositely arranged second convex longitudinal wall 43, and arcuate inner and outer longitudinal walls 45, 47, respectively. Other geometries can also be visualized for forming a supporting or interlocking arrangement of the longitudinal tubes so that a semi-solid ring shape results.

The fluidic displacement pipes of the invention thus provide a method of decreasing the amount of drilling fluid required to fill a string of horizontal directional drilling pipe, by decreasing the internal diameter of the pipe, the method comprising the steps of:

providing a metallic outer tube formed into a one piece forged pipe, the pipe having an upset outer tube pin end and an oppositely arranged upset outer tube box end, the pipe also having an internal surface defined by an internal diameter and an external surface and an initially void interior space;

installing a plurality of lengths of a flexible, substantially non-metallic inner tube that is formed of an synthetic material which differs from the material of the outer tube within the outer tube so that the inner tube is substantially enclosed within and generally coaxially aligned with the outer tube, the inner tube having an internal diameter and an external diameter which is closely received within internal diameter of the outer tube; and wherein the inner tube is made up of a plurality of lengths of synthetic plastic type material which pass through the internal diameter of the outer pipe and form a semi-solid circular ring of material which occupies the space along the internal diameter of the outer tube between the upset pin and box ends, respectively.

An invention has been provided with several advantages. The fluidic displacement pipes of the invention save time during a horizontal drilling operation in initially pressuring up the drill string, as well as in clean-up operations. The method is simple to practice with the inner tubes even being installable by hand. The materials used to form the inner tubes are relatively inexpensive plastic type materials which are readily available in the marketplace from a number of sources. The tubes can be installed after the one piece drill pipe has been forged. The method may require only minimal changes in size, dimension or general design of the existing one piece forged drill pipe.

What is claimed is:

1. A one piece forged fluidic displacement pipe for horizontal directional drilling operations, comprising:
    a metallic outer tube formed into a one piece forged pipe, the pipe having an upset outer tube pin end having a first internal diameter and an oppositely arranged upset outer tube box end having a second internal diameter, the pipe also having an internal surface located between the upset outer tube pin end first internal diameter and the upset outer tube box end second internal diameter which has a third internal diameter that defines an initially void interior space, the third internal diameter being greater than either of the first and second internal diameters;
    an inner tube installed as discrete pieces within the outer tube, the inner tube being substantially enclosed within the initially void interior space of the outer tube and being generally coaxially aligned with the outer tube in use, the inner tube having an internal diameter and an external diameter which is closely received within the third internal diameter of the outer tube;

wherein the inner tube is made up of a plurality of lengths of material which are small enough to pass through the smaller first and second internal diameters of the forged pin and box ends of the outer pipe into the larger initially void interior space of the outer tube where they are arranged in a circumferential pattern to form a semi-solid circular ring of material which occupies the space along the third internal diameter of the outer tube between the upset pin and box ends, respectively.

2. The one piece forged fluidic displacement pipe of claim 1, wherein the plurality of lengths of type material are sequentially inserted through a selected one of the upset pin and box ends of the pipe after both of the upset ends of the pipe are forged and into the space between the pin and box upset ends and wherein the lengths of material support each other to form a continuous ring shaped pattern with external surfaces which contact the internal diameter of the outer pipe and internal surfaces which form a cylindrical bore once installed within the outer pipe; and wherein plurality of lengths of material comprise uniform segments of a solid cylindrical body when viewed in cross section.

3. The one piece forged fluidic displacement pipe of claim 2, wherein the plurality of lengths of material are formed of a synthetic material selected from the group consisting of:

polyvinyl chloride, acrylonitrile butadiene styrene, acrylics, cellulose acetate butyrate, polycarbonate, low density polyethylene, high density polyethylene, polypropylene, styrene, polyurethane, polyethylene terephthlate glycol/copolyester, styrene butadiene copolymer, thermoplastic rubber (TPR) and thermoplastic elastomer (TPE).

4. The one piece forged fluidic displacement pipe of claim 1, wherein the one piece forged pipe has a surface end and a bit end and wherein the bit end is connected to a downhole drilling tool.

5. The one piece forged fluidic displacement pipe of claim 4, further comprising:

a horizontal directional drilling machine connected to a string of the fluid displacement pipe for conveying fluid under pressure through the internal diameter of the inner tube toward the bit end and the downhole drilling tool.

6. A one piece forged fluidic displacement pipe for horizontal directional drilling operations, comprising:

a metallic outer tube formed into a one piece forged pipe, the pipe having an unset outer tube pin end and an oppositely arranged upset outer tube box end, the pipe also having an internal surface defined by an internal diameter and an external surface and an initially void interior space;

a flexible, substantially non-metallic inner tube that is formed of an synthetic material which differs from the material of the outer tube and that is substantially enclosed within and generally coaxially aligned with the outer tube in use, the inner tube having an internal diameter and an external diameter which is closely received within the internal diameter of the outer tube;

wherein the inner tube is made up of a plurality of lengths of synthetic plastic type material which pass through the internal diameter of the outer pipe and form a semi-solid circular ring of material which occupies the space along the internal diameter of the outer tube between the upset pin and box ends, respectively;

wherein the plurality of lengths of synthetic plastic type material are inserted through a selected one of the upset pin and box ends of the pipe after the pipe is forged and into the space between the pin and box unset ends and wherein the lengths of synthetic plastic type material support each other to form a continuous ring shaved pattern with external surfaces which contact the internal diameter of the outer pipe and internal surfaces which form a cylindrical bore once installed within the outer pipe;

wherein plurality of lengths of synthetic plastic type material comprise uniform segments of a solid cylindrical body when viewed in cross section; and wherein the plurality of lengths of synthetic plastic type material are formed as hollow longitudinal members which are plugged or capped at each end.

7. A method of decreasing the amount of drilling fluid required to fill a string of horizontal directional drilling pipe, by decreasing the internal diameter of the pipe, the method comprising the steps of:

providing a metallic outer tube formed into a one piece forged pipe, the pipe having an upset outer tube pin end having a first internal diameter and an oppositely arranged upset outer tube box end having a second internal diameter, the pipe also having an internal surface located between the upset outer tube pin end first internal diameter and the upset outer tube box end second internal diameter which has a third internal diameter that defines an initially void interior space, the third internal diameter being greater than either of the first and second internal diameters;

forming an inner tube within the outer tube, the inner tube being formed by sequentially installing a plurality of lengths of a selected material provided in discrete pieces, so that the inner tube is substantially enclosed within the initially void interior space of the outer tube and generally coaxially aligned with the outer tube, the inner tube having an internal diameter and an external diameter which is closely received within the internal third diameter of the outer tube; and wherein the plurality of lengths of material are small enough to pass through the smaller first and second internal diameters of the forged pin and box ends of the outer pipe into the larger initially void interior space of the outer tube where they are arranged in a circumferential pattern to form a semi-solid circular ring of material which occupies the space along the third internal diameter of the outer tube between the upset pin and box ends, respectively; and wherein the plurality of lengths of material are sequentially inserted through a selected one of the upset pin and box ends of the pipe and into the space between the pin and box upset ends after both of the upset ends of the pipe are forged and wherein the lengths of material support each other to form a continuous ring shaped pattern with external surfaces which contact the third internal diameter of the outer pipe and internal surfaces which form a cylindrical bore once installed within the outer pipe.

8. The method of claim 7, wherein plurality of lengths of material comprise uniform segments of a solid cylindrical body when viewed in cross section.

9. The method of claim 8, wherein the plurality of lengths of material are formed of a synthetic material selected from the group consisting of:

polyvinyl chloride, acrylonitrile butadiene styrene, acrylics, cellulose acetate butyrate, polycarbonate, low density polyethylene, high density polyethylene, polypropylene, styrene, polyurethane, polyethylene terephthlate glycol/copolyester, styrene butadiene copolymer, thermoplastic rubber (TPR) and thermoplastic elastomer (TPE).

10. A method of decreasing the amount of drilling fluid required to fill a string of horizontal directional drilling pipe, by decreasing the internal diameter of the pipe, the method comprising the steps of:
providing a metallic outer tube formed into a one piece formed pipe, the pipe having an upset outer tube pin end and an oppositely arranged upset outer tube box end, the pipe also having an internal surface defined by an internal diameter and an external surface and an initially void interior space;
installing a plurality of lengths of a flexible, substantially non-metallic inner tube that is formed of an synthetic material which differs from the material of the outer tube within the outer tube so that the inner tube is substantially enclosed within and generally coaxially aligned with the outer tube, the inner tube having an internal diameter and an external diameter which is closely received within the internal diameter of the outer tube;
wherein the inner tube is made up of a plurality of lengths of synthetic plastic type material which pass through the internal diameter of the outer pipe and form a semi-solid circular ring of material which occupies the space along the internal diameter of the outer tube between the upset pin and box ends, respectively;
wherein the plurality of lengths of synthetic plastic type material are inserted through a selected one of the upset pin and box ends of the pipe and into the space between the pin and box upset ends after the pipe is forged and wherein the lengths of synthetic plastic type material support each other to form a continuous ring shaped pattern with external surfaces which contact the internal diameter of the outer pipe and internal surfaces which form a cylindrical bore once installed within the outer pipe;
wherein plurality of lengths of synthetic plastic type material comprise uniform segments of a solid cylindrical body when viewed in cross section;
wherein the plurality of lengths of synthetic plastic type material are formed of a material selected from the group consisting of:
polyvinyl chloride, acrylonitrile butadiene styrene, acrylics, cellulose acetate butyrate, polycarbonate, low density polyethylene, high density polyethylene, polyproylene, styrene, polyurethane, polyethylene terephthlate glycol/copolyester, styrene butadiene copolymer, thermoplastic rubber (TPR) and thermoplastic elastomer (TPE); and
wherein the plurality of lengths of synthetic plastic type material are formed as hollow longitudinal members which are plugged or capped at each end.

11. The method of claim 10, wherein a plurality of lengths of the one piece forged pipe are used to make up a string of drill pipe used in a horizontal directional drilling operation.

* * * * *